(12) United States Patent
Puckett et al.

(10) Patent No.: US 8,047,219 B2
(45) Date of Patent: Nov. 1, 2011

(54) BLOCK AND BLEED PLUGGING TOOL EMPLOYING SEALS ON A PIPELINE EXTERIOR

(75) Inventors: Gregory L. Puckett, Broken Arrow, OK (US); Tony R. Garrison, Bixby, OK (US)

(73) Assignee: TDW Delaware Inc., Wilmington, DE (US)

( * ) Notice: Subject to any disclaimer, the term of this patent is extended or adjusted under 35 U.S.C. 154(b) by 319 days.

(21) Appl. No.: 12/403,664

(22) Filed: Mar. 13, 2009

(65) Prior Publication Data
US 2010/0229958 A1 Sep. 16, 2010

(51) Int. Cl.
*F16L 55/18* (2006.01)
(52) U.S. Cl. .......... 137/15.12; 137/317; 138/91; 138/94
(58) Field of Classification Search .... 137/15.12–15.14, 137/317, 318, 614.11, 614.21; 285/197; 251/900; 138/89, 91, 94
See application file for complete search history.

(56) References Cited

U.S. PATENT DOCUMENTS

| | | | |
|---|---|---|---|
| 3,170,226 A | 2/1965 | Larry | |
| 3,599,663 A | 8/1971 | Ver Nooy | |
| 3,614,252 A | 10/1971 | Rose et al. | |
| 3,626,475 A | 12/1971 | Hicks | |
| 3,665,966 A | 5/1972 | Ver Nooy | |
| 3,785,041 A | 1/1974 | Smith | |
| 3,835,889 A | 9/1974 | Hyde | |
| 3,872,880 A | 3/1975 | Ver Nooy et al. | |
| 4,411,459 A | 10/1983 | Ver Nooy | |
| 4,579,484 A | 4/1986 | Sullivan | |
| 4,620,731 A | 11/1986 | Rushing | |
| 4,880,028 A | 11/1989 | Osburn et al. | |
| 5,439,331 A | 8/1995 | Andrew et al. | |
| 5,443,095 A | 8/1995 | Glossop, Jr. | |
| 5,531,250 A | 7/1996 | Freeman et al. | |
| 5,612,499 A | 3/1997 | Andrew et al. | |

(Continued)

FOREIGN PATENT DOCUMENTS
GB 1064398 4/1967

OTHER PUBLICATIONS

International Search Report and Written Opinion issued by the International Searching Authority (ISA/US) in PCT/US2010/026821 on May 13, 2010 (11 pages).

*Primary Examiner* — Kevin Lee
(74) *Attorney, Agent, or Firm* — Gable Gotwals

(57) ABSTRACT

The present invention is a method of plugging a pipeline having an exterior surface including the steps of affixing to the exterior of the pipeline first and second spaced apart collars, welding each collar to the pipeline so that an operating space is provided between the collars, positioning a seal with each collar, affixing a containment housing to the opposed collars providing a confined space around the pipeline and surrounding the operating space between the collars, the confined space being accessed by a passageway, cutting and removing a length of pipeline between the collars providing opposed pipeline exterior end surfaces, positioning first and second seal cups between the collars, each seal cup having a forwardly extending circumferential lip of internal diameter greater than the external diameter of the pipeline, and applying force to move the seal cups away from each other, the circumferential lips of the seal cups engaging with the opposed seals to compress them into sealing engagement with the collars and with the pipeline exterior surfaces.

25 Claims, 10 Drawing Sheets

U.S. PATENT DOCUMENTS

| | | | |
|---|---|---|---|
| 5,676,170 A * | 10/1997 | Andonov et al. | 137/240 |
| 6,012,878 A | 1/2000 | Hicks | |
| 6,338,359 B1 | 1/2002 | Welker | |
| 7,270,139 B2 | 9/2007 | Calkins et al. | |
| 7,281,543 B2 * | 10/2007 | Calkins et al. | 137/15.12 |
| 7,766,047 B1 * | 8/2010 | Garrison et al. | 138/89 |

* cited by examiner

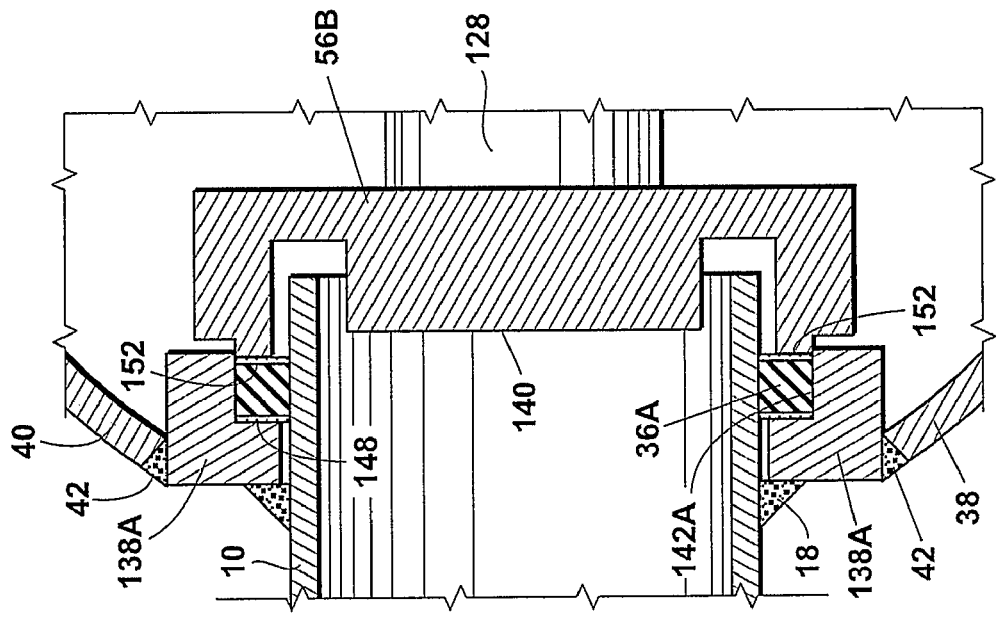
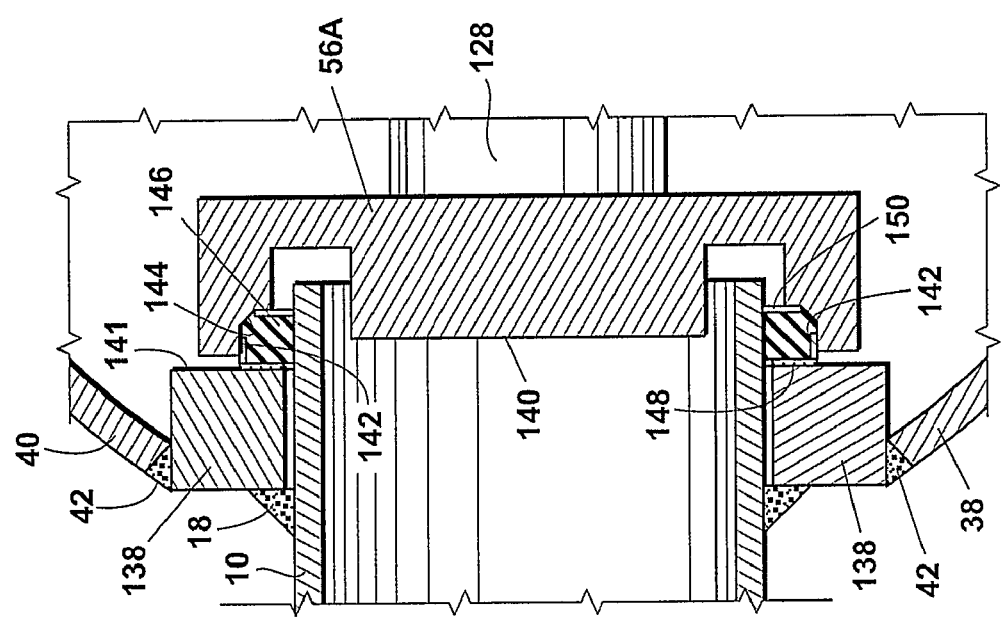

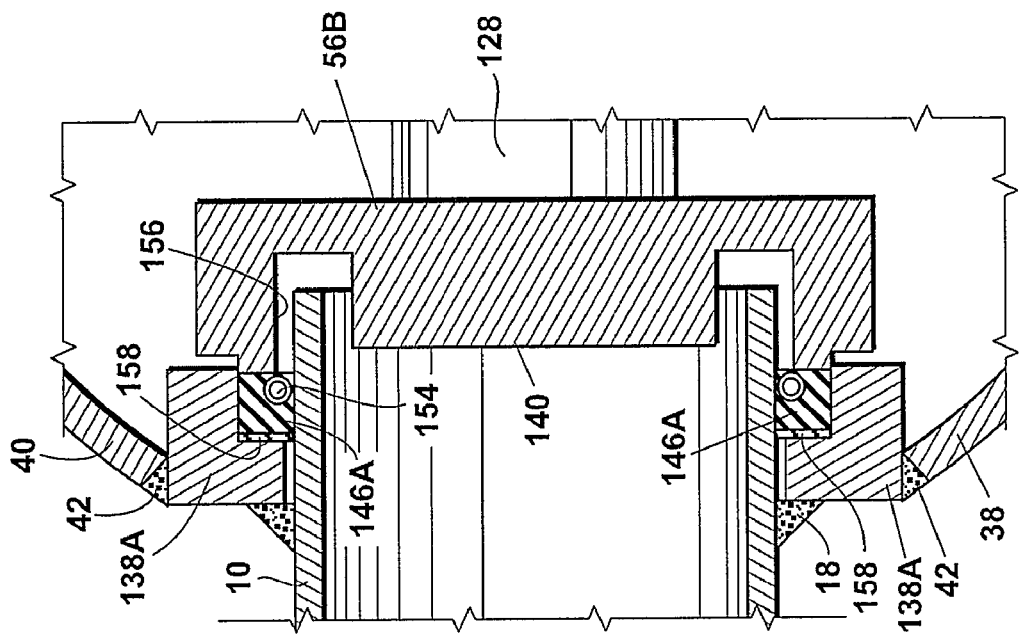
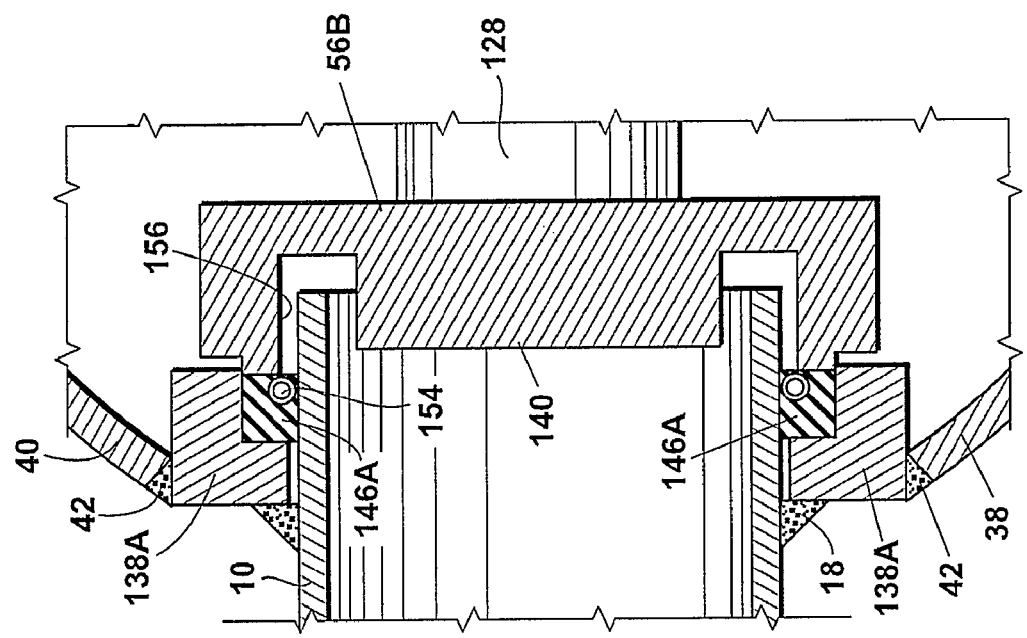

BLOCK AND BLEED PLUGGING TOOL EMPLOYING SEALS ON A PIPELINE EXTERIOR

REFERENCE TO PENDING APPLICATIONS

This application is not based upon any pending domestic or international patent applications.

FIELD OF THE INVENTION

The invention relates to apparatus systems and methods for plugging a pipeline having liquids or gases flowing therethrough utilizing seals on the exterior of the pipeline.

BACKGROUND OF THE INVENTION

This invention relates to systems and methods for plugging a pipeline under pressure. "Pipeline" as used hereinafter is inclusive of any tubular member made of metal for carrying fluid (liquids or gases). Whereas U.S. Pat. No. 7,270,139 is particularly useful for controlling flow of high temperature liquids or gases, the present invention can be used for either ambient or high temperature applications. The composition of the elastomeric seals determines the range of the applicable temperature. However, the ferrule design may be used at elevated as well as ambient temperatures.

Tools or machines for tapping or for closing fluid flow therethrough include the following:

| PAT. NO. | INVENTOR | TITLE |
| --- | --- | --- |
| 3,614,252 | Rose et al. | Tapping Apparatus |
| 4,579,484 | Sullivan | Under Water Tapping Machine |
| 4,880,028 | Osburn et al. | Completion Machines |
| 5,439,331 | Andrew et al. | High Pressure Tapping Apparatus |
| 5,612,499 | Andrew et al. | Method of Inserting A Sensor Into A Pipeline |
| 6,012,878 | Hicks | Pressure Balanced Subsea Tapping Machine |
| 7,270,139 | Calkins et al. | Cam-Assisted, Wedge Actuated, Metal-to-Metal Seal, Block and Bleed Plugging Tool |

Tapping machines, such as the kind described in the above-mentioned U.S. patents, are for tapping a hole in a pipeline while liquids or gases are flowing through them, that is, while the pipeline is under pressure. Tapping procedures of this type are customarily carried out primarily for one of two purposes, that is, to provide a branch fitting on the pipeline or to enable fluid flow through the pipeline to be blocked. Other examples of prior art that describe and illustrate plugging the interior of a pipe include the following U.S. Pat. Nos.:

| PAT. NO. | INVENTOR | TITLE |
| --- | --- | --- |
| 3,170,226 | Allan | Line Stopping and Valve Inserting Apparatus and Method |
| 3,599,663 | Ver Nooy | Hot Tapping Apparatus |
| 3,626,475 | Hicks | High Temperature Pipe-Plugging Apparatus |
| 3,665,966 | Ver Nooy | Pipe Plugger |
| 3,785,041 | Smith | Method For Plugging Pipe |
| 3,872,880 | Ver Nooy et al. | Plugging Apparatus |
| 4,411,459 | Ver Nooy | Branch Fitting for Providing Access to the Interior of a Pipe |
| 5,443,095 | Glossop, Jr. | Fluid Blocking Device |
| 5,531,250 | Freeman et al. | Device for Plugging the Interior of a Pipe |
| 7,270,139 | Calkins et al. | Cam-Assisted, Wedge Actuated, Metal-to-Metal Seal, Block and Bleed Plugging Tool |
| GB1,064,398 | Pass and Co. Ltd. | Pipe Line Plugger |

BRIEF SUMMARY OF THE INVENTION

The invention herein makes use of the known technology of welding onto a pipe having fluid flow therethrough a pair of collars. Each of the collars is a toroid that is severed to provide a set of two toroidal halves that are fitted together around the pipe. Each collar set consisting of two spaced apart parallel collars are secured to the exterior of the pipe. Each collar has a machined face which can be achieved by machining before the collars have been welded to the pipe. Thus a set of collars affixed to the exterior surface of a pipe provide forward planar faces that face each other. The collar faces are parallel to each other and spaced apart an accurately establish distance. After each collar is affixed to the pipe, the collar halves are then welded to each other. Further, the two halves of each collar are welded where the back face meets the pipe around the 360° circumference of the pipe. After the collars are installed, they provide uninterrupted circumferential planar sealing surfaces that face each other. The sealing surfaces are parallel to each other and in radial planes perpendicular to longitudinal axis of the pipe.

The sealing face of each collar includes a circumferential recess, or circumferential slot, adjacent the interior circumferential surface of the pipe to which they are affixed.

After the collars are welded to the exterior surface of a pipe, containment fittings are welded to the collars to provide a housing of internal dimensions greater than the external surface of the pipe. The shape of the containment fittings can vary. One type of containment housing, as illustrated herein, is in the form of a sphere with an open top, or the housing can be non-spherical by having a bottom usually in the form of a cup shaped member with a flange fitting at the upper end.

After the containment housing, which may include a bottom member and an upper flange, has been welded to the collars, the containment housing is typically pressure tested to ensure there are no leaks and that the collars and the containment housing have the structural integrity to contain the maximum pressure to which they will be subjected.

Even though the preferred embodiment for installing the collars is described above, it is recognized that the collars may be pre-welded to the containment fittings prior to being welded to the pipe.

After the collars and the containment housing components have been installed and tested, a valve is secured to the containment housing flange. A tapping machine system, well known in the industry, is secured to the upper surface of the valve and then pressure is applied to test for leaks. Thereafter, by use of the tapping machine, a complete section of the pipeline is removed from between the collars. The concept of removing a complete section rather than tapping only a hole in the pipe is illustrated in U.S. Pat. No. 5,612,499 entitled "Method of Inserting A Sensor Into A Pipeline". When a section of the pipeline has been cut, it is removed exposing the opposed ends of the cutout section of the pipeline, the exposed ends being surrounded by the collars that have previously been attached to the pipe.

After the collars and the containment housing components have been affixed to the exterior of the pipe, a tapping machine attached and a section of the pipe is cut and removed, the next step is to seal the opposed ends of the pipe employing a plugging tool. The plugging tool is inserted as an assembly into the interior of the containment housing. The plugging tool carries with it opposed sealing cups, each having a circumferential sealing surface of internal diameter greater than the external diameter of the pipe. The plugging tool assembly is lowered into the containment housing and actuated such that the opposed sealing cups are advanced in directions towards the open ends of a severed pipe and towards opposed circumferential elastomeric seals supported in the circumferential slot on each collar.

In one embodiment the plugging tool assembly includes upper and lower cam followers affixed to each of the seal cups rearwardly of the forward faces thereof. Top and bottom supports each having a pair of cam slots for receiving the cam followers and are configured to urge the seal cups towards the toroidal elastomeric seals carried by each of the collars. The plugging tool assembly includes translation apparatus for moving the top and bottom supports away from each other to thereby urge the seal cups towards the toroidal elastomeric seals.

In one embodiment of the invention a pair of wedge members are forced against rearward surfaces of the seal cups to simultaneously force them into sealing contact with the elastomeric seals on the toroidal collars. In this manner a double block and bleed plugging tool is achieved. After both of the seal cups are forced into sealing condition the interior of the containment housing can be tested to verify that both seal cups are in leak-proof contact with the elastomeric seals on the toroidal collars.

In another embodiment, the seal cups are forced into contact with the circumferential elastomeric seals by means a hydraulic cylinder having pistons extending from opposed sides, each piston being laterally displaced by hydraulic fluid forced into the hydraulic cylinder.

In another embodiment, the seal cups are forced into contact with malleable metallic ferrules which are sealably crimped onto the exterior of the pipe.

Further objects and features of the present invention will be apparent to those skilled in the art upon reference to the accompanying drawings and upon reading the following description of the preferred embodiments.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

FIG. 5 is a fragmentary external view of an alternate embodiment of the invention showing an arrangement wherein an elastomeric seal is received on the pipe and in contact with the forward face of a collar and wherein the collar is of square cross-sectional configuration, that is, the collar does not have a circumferential slot for receiving an elastomeric seal.

FIG. 6 is an elevational cross-sectional fragmentary view showing the end of a pipe as in FIG. 5 but wherein the collar has a circumferential slot therein that receives an elastomeric seal. In FIG. 6, the elastomeric seal has a cloth backing on the forward and rearward planar surfaces.

FIG. 7 is an additional elevational cross-sectional fragmentary view as in FIGS. 5 and 6 showing the use of an elastomeric seal that includes integrally therewith anti-extrusion springs.

FIG. 8 is an additional elevational cross-sectional partial view showing an elastomeric seal supported within a circumferential slot in a collar secured to the exterior of a pipeline and wherein the elastomeric seal has a cloth reinforcing against the rearward face thereof and wherein the forward face includes an anti-extrusion spring.

FIG. 16 also shows an alternate embodiment of the retainer used to hold a ferrule in position as it is mounted on the pipeline in which the retainers are thinner in the direction away from the area wherein the ferrules are retained to thereby provide for increased flexibility of the retainers.

DETAILED DESCRIPTION OF THE PREFERRED EMBODIMENTS

It is to be understood that this invention is not limited in its application to the details of construction and arrangement of parts illustrated in the accompanying drawings. The invention is capable of other embodiments and of being practiced or carried out in a variety of ways. The phraseology and terminology employed herein are for the purpose of description and not of limitation.

Elements shown by the drawings are identified by the following numbers:

| | |
|---|---|
| 10 | Portion of the pipeline |
| 12 | Portion of the same pipeline |
| 14 | First collar |
| 16 | Second collar |
| 18 | Circumferential weld |
| 20 | Circumferential weld |
| 22 | Forward face |
| 24 | Forward face |
| 26 | Circumferential slot |
| 28 | Circumferential slot |
| 30 | Rearward face |
| 32 | Rearward face |
| 34 | Circumferential elastomeric seal |
| 36 | Circumferential elastomeric seal |
| 36A | Elastomeric seal |
| 38 | Containment housing, lower portion |
| 40 | Containment housing, upper portion |
| 42 | Welds |
| 44 | Flange |
| 46 | Passageway |
| 48 | Pipe sealing assembly |
| 50 | Top support |
| 52 | Lower support |
| 54 | Vertical shaft |
| 56 | First seal cup |
| 56A, B | Seal cup |
| 58 | Second seal cup |
| 60 | Upper arms |
| 62 | First roller |
| 64 | Upper arms |
| 66 | Second roller |
| 68 | Downward arms |
| 70 | Downward arms |
| 72 | Roller |
| 74 | Roller |
| 75 | Cam slot |
| 76 | Cam slot |
| 78 | Cam slot |
| 80 | Cam slot |
| 82 | Compression spring |
| 84 | Shaft guide |
| 86 | Top plate |
| 88 | First wedge member |
| 90 | Second wedge member |
| 92 | Stop post |
| 94 | Circumferential recess |
| 96 | Circumferential recess |
| 98 | Outer end of pipe |
| 100 | Outer end of pipe portion 12 |
| 102 | Circumferential sealing surface |
| 104 | Circumferential sealing surface |
| 106 | Lower containment portion |
| 108 | Upper containment portion |
| 109 | End cap |
| 110 | Collar |
| 112 | Collar |
| 114 | Frusto-conical surface |
| 116 | Circumferential elastomeric seal |
| 118 | Circumferential elastomeric seal |
| 120 | Tubular housing |
| 122 | Double ended hydraulic cylinder |
| 124 | Positioning element |
| 126 | Recess |
| 128 | Piston |
| 130 | Piston |
| 132 | Hydraulic fluid pressure source |
| 134 | Hydraulic hose |
| 136 | Inlet |
| 138 | Collar |
| 138A | Collar |
| 140 | Forward face of the seal |
| 141 | Forward face of the collar |
| 142 | Internal circumferential slot |
| 142A | Internal circumferential slot |
| 144 | Inclined surface |
| 146 | Circumferential elastomeric seal |
| 146A | Circumferential elastomeric seal |
| 148 | Cloth |
| 150 | Snap ring |
| 152 | Rearward cloth face |
| 154 | Anti-extrusion spring |
| 156 | Interior surface |
| 158 | Forward cloth face |
| 160 | Metallic ferrule |
| 162 | Retainers |
| 164 | Bolt |
| 166 | Recess |
| 168 | Forward face |
| 170 | Radial face |

Figure 1:
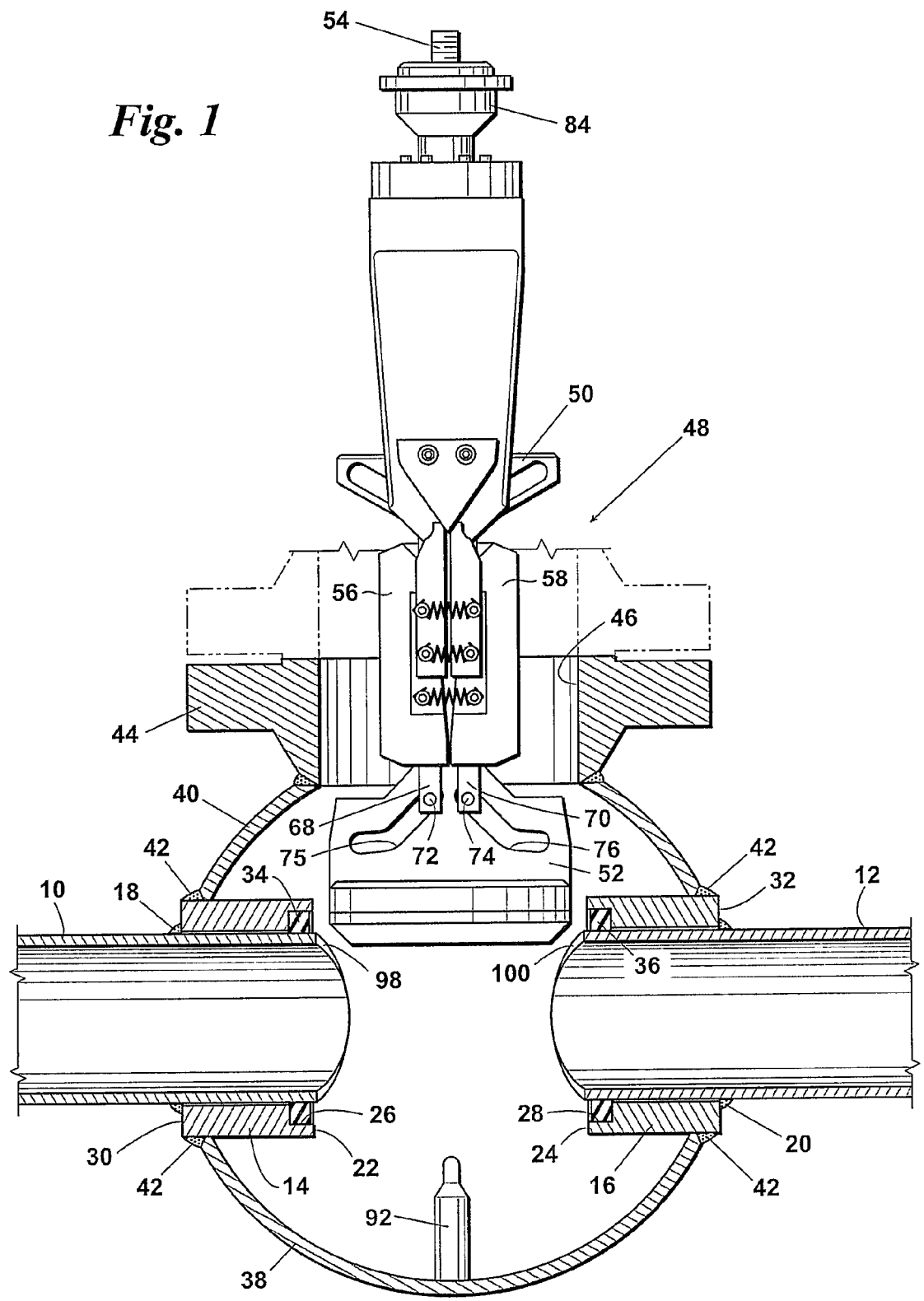
FIG. 1 is an elevational cross-sectional view of portions of the length of a pipeline having affixed to it a set of collars and a containment housing of the spherical type in which a portion of the pipeline between the collars has been removed. Shown partially within the containment housing, in external view, is a cam actuated plugging system which carries with it first and second seal cups.

Referring to the drawings and first to FIG. 1, a cross-sectional view of the portion of a length of a pipeline is shown after the pipeline has been cut in two and a portion thereof removed in the practice of the invention. A first portion of the length of the pipeline is identified by the numeral 10 and a second portion of the same pipeline shown in cross-section is identified with the numeral 12. A portion of the pipeline extending from the illustrated portions 10 and 12 has been removed, discarded and is not illustrated. Prior to removal of the missing portion, FIG. 1 shows that a first circumferential angular collar 14 and a spaced apart, second collar 16 have been affixed to the pipeline. Each of the collars in their assembled form are short length tubular members. While not shown in FIG. 1 each of collars 14 and 16 is formed of two halves that are assembled on the pipeline. The assembled portions are welded to the pipeline by rearward circumferential welds 18 and 20. The semi-cylindrical collar portions are then welded longitudinally to each other (not seen in FIG. 1) so that after the welds are completed, collars 14 and 16 are each an integral short length cylindrical member having a forward face. The forward face of collar 14 is identified by the numeral 22 and, in like manner, the forward face of collar 16 is identified by the numeral 24. The forward face 22 of collar 14 is provided with a circumferential slot 26 and in like manner, forward face 24 of collar 16 has a circumferential slot 28. The collars 14 and 16 have rearward faces 30 and 32 where welds 18 and 20 are performed.

Positioned within circumferential slot 26 is a circumferential elastomeric seal 34 and in circumferential slot 28 a circumferential elastomeric seal 36.

To provide containment of any fluid, whether liquid or gas, within pipeline 10, 12 a containment housing consisting of a lower portion 38 and a corresponding containment housing upper portion 40 is secured to collars 14 and 16 by welds 42. The containment housing upper portion 40 has an opening therein to which is secured a flange 44 of the type to which various piping fittings or valves can be secured by bolts (not shown).

Positioned within passageway 46 within flange 44 is a pipe sealing assembly 48 that is illustrated and described in detail in U.S. Pat. No. 7,270,139 which is incorporated herein by reference. The invention herein is not concerned with details of the pipe sealing assembly 48 but instead the essence of this invention is a method of forming seal around the external circumferential surface pipeline 10, 12 as a method of closing off fluid flow through the pipeline. Essentially the pipe sealing assembly 48 includes a top support 50 and a lower support 52.

Positioned between top support 50 and lower support 52, that are retained by vertical shaft 54, is a first seal cup 56 and, opposed to it, a second seal cup 58.

Figure 2:
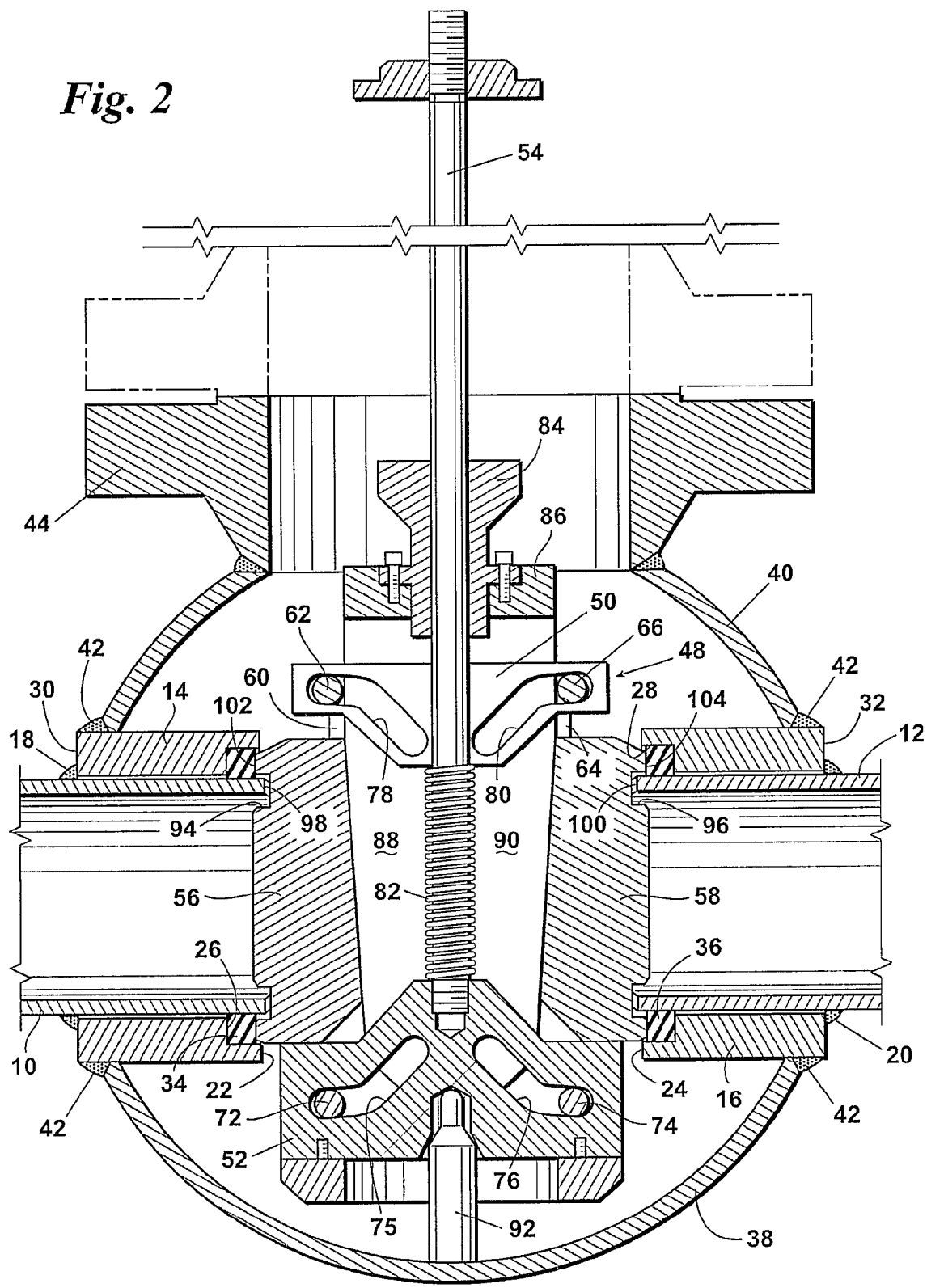
FIG. 2 is a cross-sectional view of a containment housing with collars affixed to the exterior of a pipe and a portion of the pipe having been removed as shown in FIG. 1. In this figure the plugging assembly has been inserted into the containment housing and between opposed ends of the pipe. This figure shows the plugging assembly having been inserted into the containment housing and actuated to force sealing cups in opposite directions from each other and into sealing relationship with elastomeric seals carried by the opposed collars.

As seen in FIG. 2, first seal cup 56 has upwardly extending arms 60 that are supported to a first roller 62. Seal cup 58 has upwardly extending arms 64 that are supported to a second roller 66. As seen in FIG. 1, first seal cup 56 has downwardly extending arms 68 while second seal cup 58 has downwardly extending arms 70. These downwardly extending arms 68 and 70 are supported to lower rollers 72 and 74. As seen in FIG. 2, lower support 52 has a pair of cam slots 75 and 76 that receives lower rollers 72 and 74. In like manner, top support 50 has a pair of cam slots 78 and 80 that receives upper rollers 62 and 66. When top support 50 is moved in a direction away from lower support 52, rollers 62, 66, 72 and 74 acting in the cam slots 75, 76, 78 and 80 serve to deflect seal cups 56 and 58 toward each other and when top and bottom supports 50 and 52 move towards each other, seal cups 56 and 58 are forced away from each other.

Received on shaft 54 and compressibly positioned between lower support 52 and top support 50 is a compression spring 82. The downward translation of shaft guide 84 and top plate 86 and with it first and second wedge members 88 and 90, forces top support 50 towards lower support 52 compressing spring 82 and moving the top roller 62 and 66 within the cam formed in top support 50 and bottom rollers 72 and 74 within the cam formed in lower support 52. This cam action causes first and second seal cups 56 and 58 to displace outwardly with respect to each other. The downward movement of lower support 52 is limited by a stop post 92 affixed to the interior of containment housing lower portion 38.

First seal cup 56 has on its forward face a circumferential recess 94. In like manner, second seal cup 58 has in its forward face a circumferential recess 96. The function of recesses 94 and 96 are to receive the outer ends of pipe portions 10 and 12 respectively as seal cups 56 and 58 are expanded outwardly with respect to each other. This allows a circumferential sealing surface 102 on first seal cup 56 and a corresponding circumferential sealing surface 104 on sealing cup 58 to simultaneously engage circumferential elastomeric seals 34 and 36.

When seal cups 56 and 58 are displaced away from each other circumferential sealing surface 102 of first seal cup 56 and circumferential sealing surface 104 of second seal cup 58 simultaneously engage circumferential elastomeric seals 34, 36. This engagement closes communication between the interior of pipeline portions 10 and 12 thereby blocking fluid flow through the pipeline. When circumferential sealing surfaces 102 and 104 engage circumferential elastomeric seals 34 and 36 they simultaneously compress the elastomeric seals to increase sealing pressure against the external circumferential surface of pipe portions 10 and 12. When the pipe sealing assembly 48 as shown in FIGS. 1, 2 and 3 is upwardly withdrawn, the seal cups 56 and 58 are removed to leave fluid flow through pipe portions 10 and 12 unobstructed.

Figure 3:
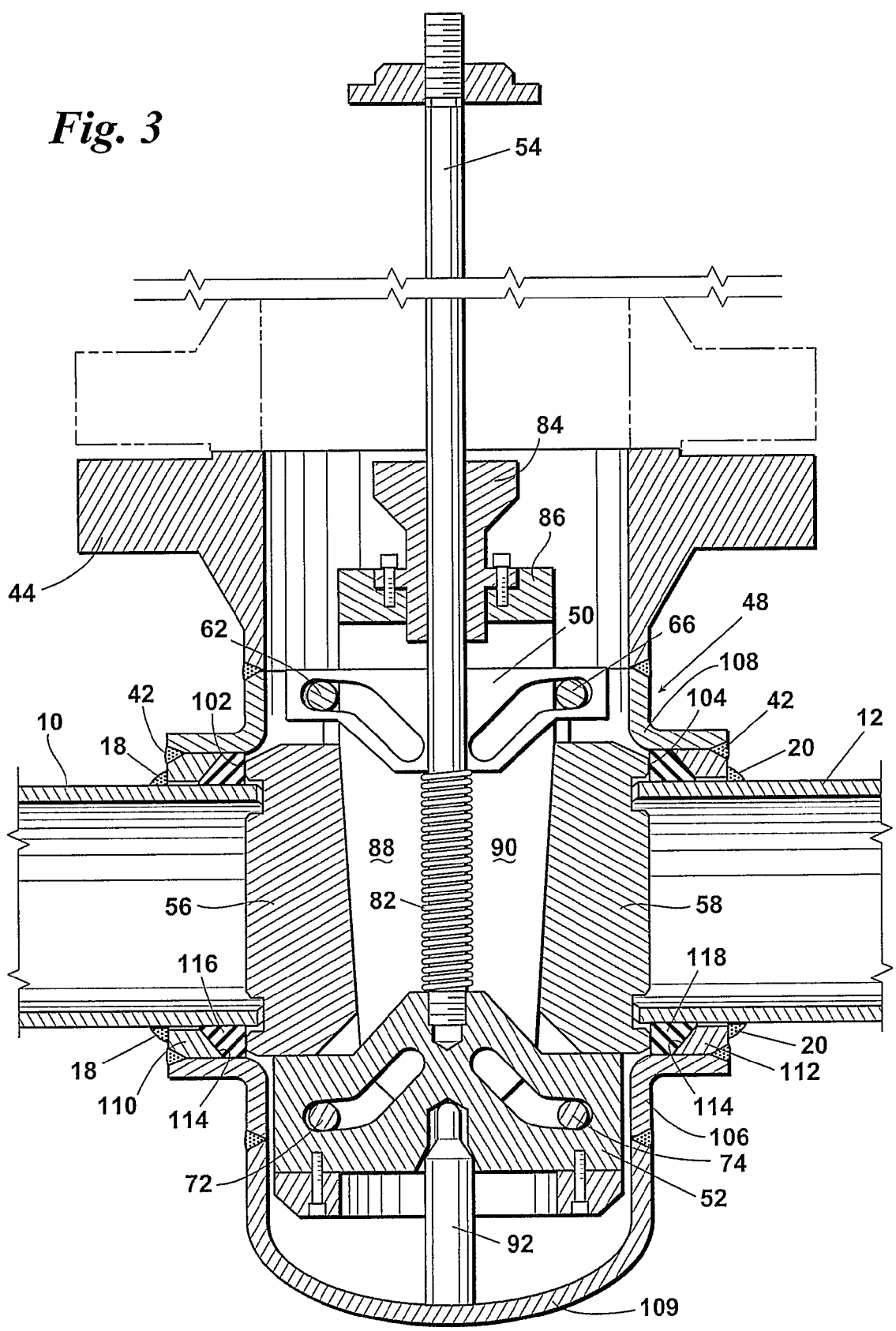
FIG. 3 is a cross-sectional view as shown in FIG. 2 but different from FIG. 2 in that in this figure a containment housing that is secured to the opposed collars is of a different, non-spherical form. In this figure the collars are of trapezoidal cross-sectional configuration and in like manner, the circumferential elastomeric seals are trapezoidal to conform in part to the forward surface configuration of the collars. In this figure the seal cups are shown as having been extended to be in sealing contact with elastomeric seals surrounding the exterior surfaces of the pipeline.

FIG. 3 shows an alternate arrangement for the invention wherein, rather in a spherical containment housing as shown in FIGS. 1 and 2, containment is achieved by the use of a lower containment portion 106 and an upper containment portion 108. While not illustrated in the drawings these containment housing portions are each formed by two halves that are welded together and simultaneously welded to collars 110 and 112. While the cross-sectional configuration of collars 110 and 112 are completely different than collars 14 and 16 as seen in FIGS. 1 and 2, the basic functions are the same. FIG. 3 collars 110 and 112 are each trapezoidal and have frustoconical surfaces 114 facing in the direction towards seal cups 56 and 58.

A further difference between FIG. 3 and the embodiment of FIGS. 1 and 2 is that in FIG. 3 the circumferential elastomeric seals 116 and 118 are trapezoidal to form a mating relationship with collars 110 and 112. In the arrangement of FIG. 3 as the seal cups 56 and 58 advance away from each other their circumferential sealing surfaces 102 and 104 compress circumferential seals 116 and 118 into sealing contact with collars 110 and 112 and, in addition, because of the angular relationship between the circumferential seals and the collars, the elastomeric seals are radially inwardly depressed relative to pipe portions 10 and 12 to effect increase sealing with the exterior of the pipe portions 10 and 12.

Figure 4:
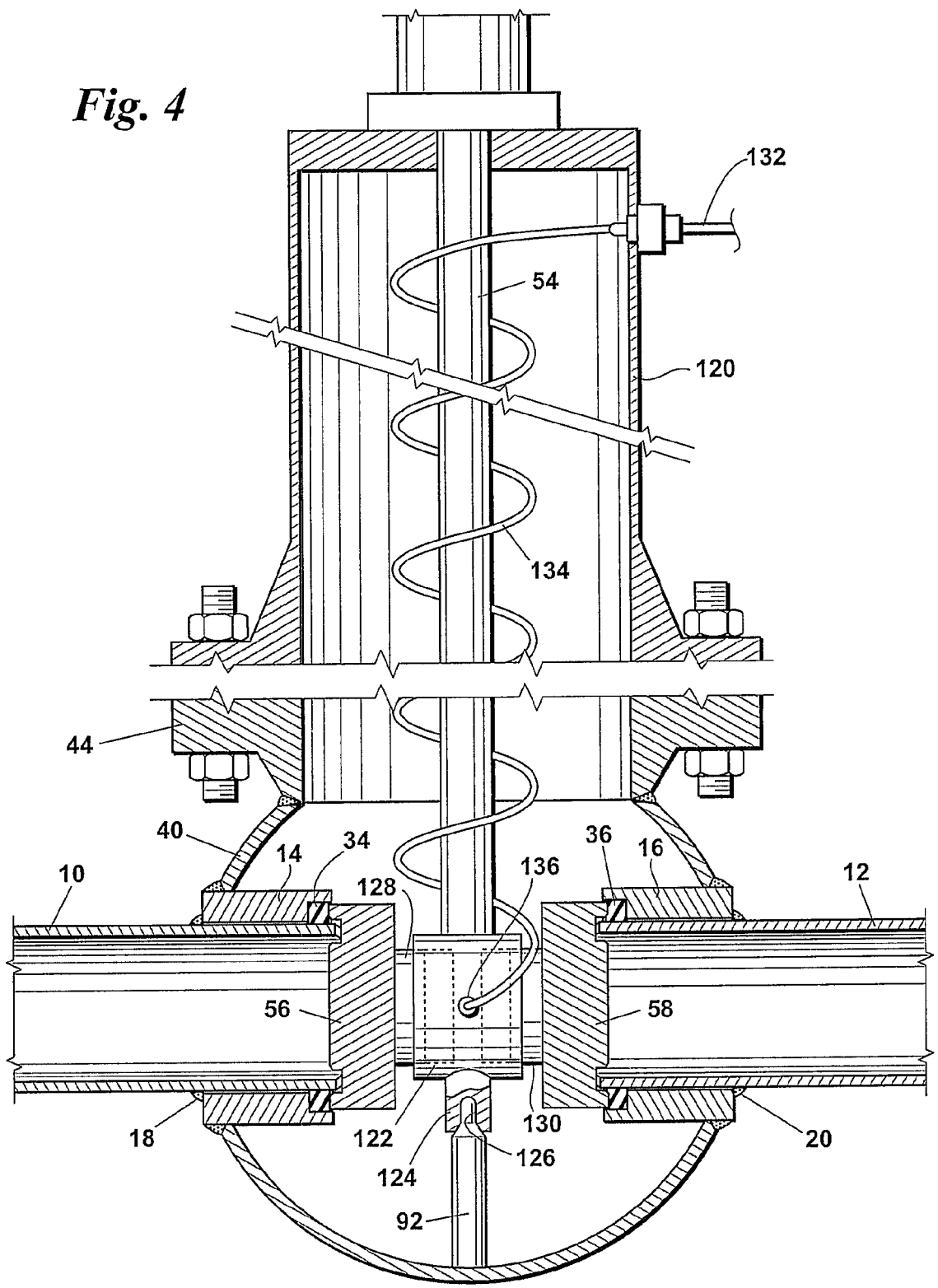
FIG. 4 is an elevational cross-sectional view, shown partially cut away, showing a different type of mechanism for expanding the seal cups into sealing engagement with elastomeric seals carried by the collars. In this embodiment the seal cups are pushed laterally away from each other and into contact with externally mounted circumferential elastomeric seals by the use of hydraulic pressure.

FIG. 4 shows an alternate embodiment of the invention which functions in the same way as the embodiments shown in FIGS. 1 through 3 except that a different system is employed to force seal cups 56 and 58 away from each other and into sealing engagement with circumferential elastomeric seals 34 and 36 held in position by collars 14 and 16. Whereas the embodiments of FIGS. 1, 2 and 3 utilize mechanical forces to urge seal cups 56 and 58 in directions towards collars 14 and 16, in the embodiment of FIG. 4 hydraulic force is employed. FIG. 4 shows a tubular housing 120 extending upwardly from flange 44. Positioned between seal cups 56 and 58 is a double ended hydraulic cylinder 122. Extending downwardly from the exterior of cylinder 122, a positioning element 124 that has a recess 126 in the lower end thereof, the recess receiving the upper end of stop post 92. The function of the cooperative relationship between stop post 92 and positioning member 124 is to accurately locate double ended hydraulic cylinder 122 in alignment with pipe ends 10 and 12.

Extending from opposed ends of double ended cylinder 122 are pistons 128 and 130. From a source of hydraulic fluid pressure 132 (not shown), a flexible hose 134 conveys fluid pressure to an inlet 136 of double ended hydraulic cylinder 122 so that when hydraulic force is applied by fluid through hydraulic hose 134 cylinders 128 and 130 are simultaneously forced outwardly in opposed directions to apply force against first and second seal cups 56 and 58. Thus the double ended hydraulic cylinder 122 with opposed pistons 128 and 130 provide the same action as is provided by pipe sealing assembly 48 in FIGS. 1, 2 and 3.

Each of FIGS. 5 through 8 functions in essentially the same way as the embodiments of FIGS. 1 through 4 except that in each of FIGS. 5, 6, 7 and 8 modifications are made in the interrelationship between the collars, the forward end the seal cups and the arrangement of the circumferential seals.

In FIG. 5 the circumferential collar 138 surrounding pipe portion 10 and to which upper and lower portions of containment housing 38 and 40 are welded is square in cross-sectional configuration. Collar 138 has a forward face 141 that extends radially of the axis of pipe section 10. In FIG. 5 seal cup 56A has a forward face 140 with an internal circumferential slot 142 having a circumferential inclined surface 144 that engages a circumferential elastomeric seal 146. The arrangement of internal circumferential slot 142 serves to capture elastomeric seal 146 and to compress it into sealed engagement between the forward face 141 of collar 138 and the exterior surface of the pipe 10. Further the arrangement of FIG. 5 is different from that in FIGS. 1, 2 and 3 in that the circumferential elastomeric seal 146 has cloth 148 on its forward surface where contact is made with collar 138. A further difference is that in the embodiment of FIG. 5 a snap ring 150 is positioned in circumferential slot 142 to provide backup for circumferential elastomeric seal 146. The arrangement of FIG. 5 provides compressive containment of circumferential elastomeric seal 146 as seal cup 56A applies compressive force to form a seal engagement between seal cup 56A and the exterior surface of pipe 10.

FIG. 6 shows an embodiment wherein the collar 138A has a forward face with a circumferential notch 142A as shown in the forward face of collar 14 of FIGS. 2 and 4. However, FIG. 6 shows the arrangement wherein the circumferential elastomeric seal 36A has a forward cloth face 148 as shown in FIG. 5 plus a rearward cloth face 152. The double cloth faces 148 and 152 of FIG. 6 provides a circumferential elastomeric seal 36A having a greatly improved dimensional stability.

FIGS. 7 and 8 show additional alternate embodiments of the manner in which elastomeric seals can be employed in a plugging tool that seals against the exterior surface of a pipe. In FIG. 7 collar 138A is the same as collar 138A of FIG. 6 and has an internal circumferential slot that receives a circumferential elastomeric seal 146A that has, confined within the elastomeric seal an anti-extrusion spring 154. This coiled anti-extrusion spring 154 reinforces the internal circumferential edge of the elastomeric seal to reduce the extrusion of the seal into the space between the exterior of pipe 10 and the interior surface 156 of the circumferential slot provided in seal cup 56B.

FIG. 8 has the improvements and advantageous of FIG. 7 plus the provision of a forward cloth face 158 affixed to circumferential seal 146A. In addition, FIG. 8 employs the advantageous of an anti-extrusion spring 154 as has been described with reference to FIG. 7. FIG. 8 shows the advantageous of the combination of an anti-extrusion spring and a cloth surface to reinforce circumferential elastomeric seal 146A.

As previously stated the invention herein is similar in many respects to the cam-assisted, wedge actuated, metal-to-metal seal, block and bleed plug tool of U.S. Pat. No. 7,270,138 with an important distinction and that is the patent teaches a block and bleed tool in which sealing is achieved by contact of metal sealing cups with metal collars, that is, metal-to-metal sealing. Whereas the present invention provides for the use of both elastomeric and metal seals and particularly provides for the unique concept of applying these seals to the exterior surface of pipe to secure a leak-proof block and bleed plugging tool. Applying seals to the exterior surface of a pipe have an important advantage compared to applying seals directly to ends of pipe or to the internal surface of pipe. This improvement is achieved since the outside surface of the pipe can be thoroughly cleaned of rust, debris, irregularities and so forth to thereby greatly improve the effectiveness of an apparatus to form leak-proof closure of the pipe. The invention herein provides improved and unique ways of using an elastomeric or a metal seal against the pipe exterior surface that achieves more consistent and superior results to other types of double block and bleed sealing systems.

While FIGS. 1 through 8 illustrate apparatuses, systems and methods of providing block and bleed of a pipeline by using elastomeric seals on the exterior of the pipeline, FIGS. 9 through 16 show such tools, apparatuses, systems and methods for sealing exposed ends of a pipeline by employing metal ferrules secured to the pipeline exterior.

Figure 9:
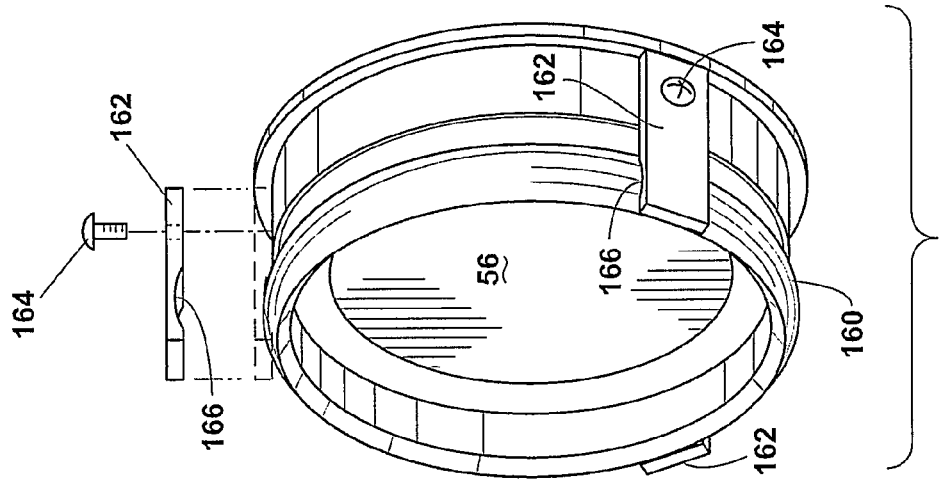
FIG. 9 is an isometric view of an alternate embodiment of the invention wherein a metallic ferrule is secured to the forward end of seal cup showing means by which the ferrule can be held in position for positioning on the end of a pipeline and the process of sealably closing flow through the pipeline.

As shown in FIG. 9, a metallic ferrule 160 is removably supported to the forward face of first seal cup 56. To removably retain ferrule 160 on the forward surface of seal cup 56, a plurality of radially spaced apart retainers 162 are employed. Each retainer is an elongated metallic clip that is secured to the external circumferential surface of first seal cup 56 and held in place by a threaded bolt 164. Each of the retainers 162 has a recess 166 adjacent its forward end. Retainers 162 are flexible so that metallic ferrules 160 are held in position so that they can be advanced over the end of a cut length of pipeline but after the fenules are secured in position on the exterior surface of the pipeline, the seal cup 56 can be withdrawn, leaving the ferrules 160 in position on the pipeline.

Figure 10:
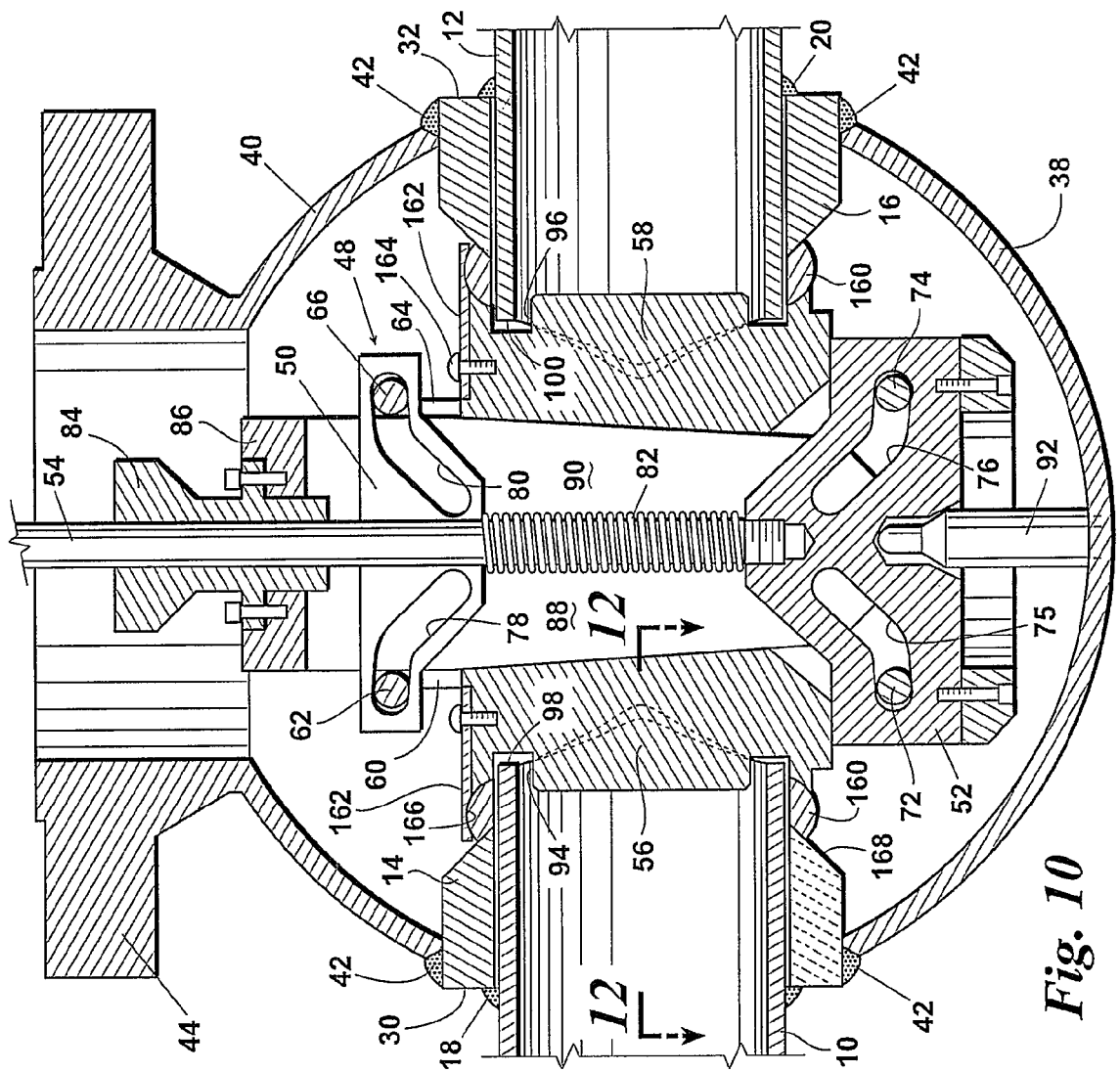
FIG. 10 is a cross-sectional elevational view as previously shown in FIG. 2 but showing the arrangement of the invention wherein instead of an elastomeric seal as in FIG. 2, a metallic ferrule is positioned on each end of the exposed pipeline after the pipeline has been cut and wherein the metallic seals can be deformed by the application of force to sealably close against the forward face of the collars.

FIG. 10 shows the first and second seal cups 56 and 58 deployed to seal against the portions of the pipeline 10 and 12. The ferrules 160 are crimped to the frusto-conical forward faces 168 of the first and second collar 14 and 16 and the exterior surface of the pipeline.

Figure 12:
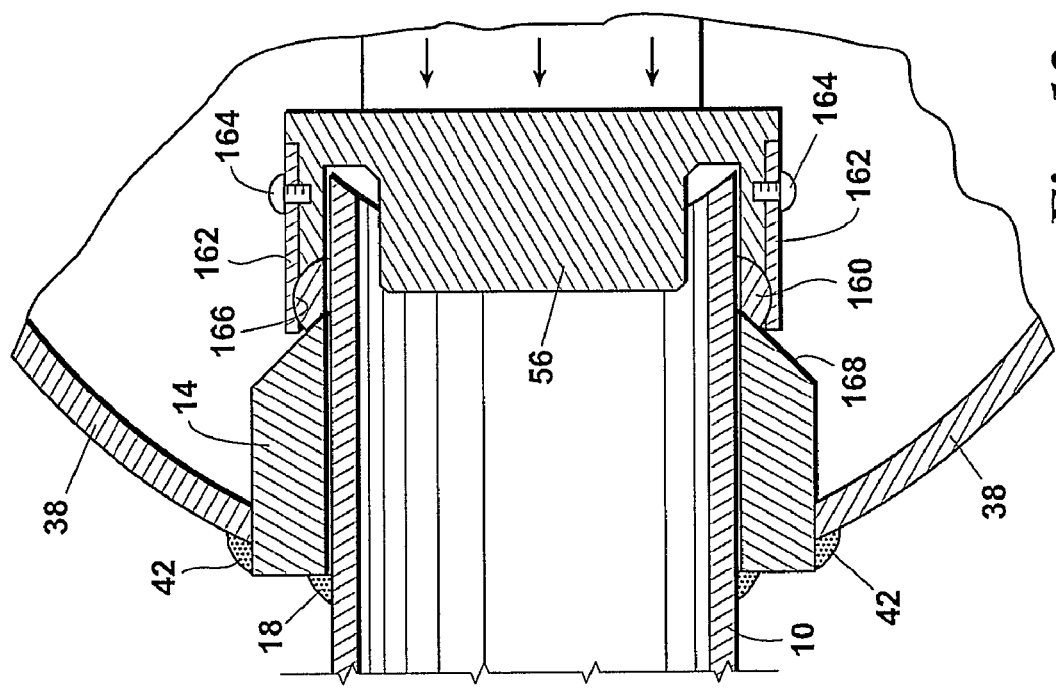
FIG. 12 is an illustration as in FIG. 11 but showing the first seal cup 56 having been advanced to move the ferrule into contact with the forward face of the first collar in the process of sealing the end of the pipe.
Figure 11:
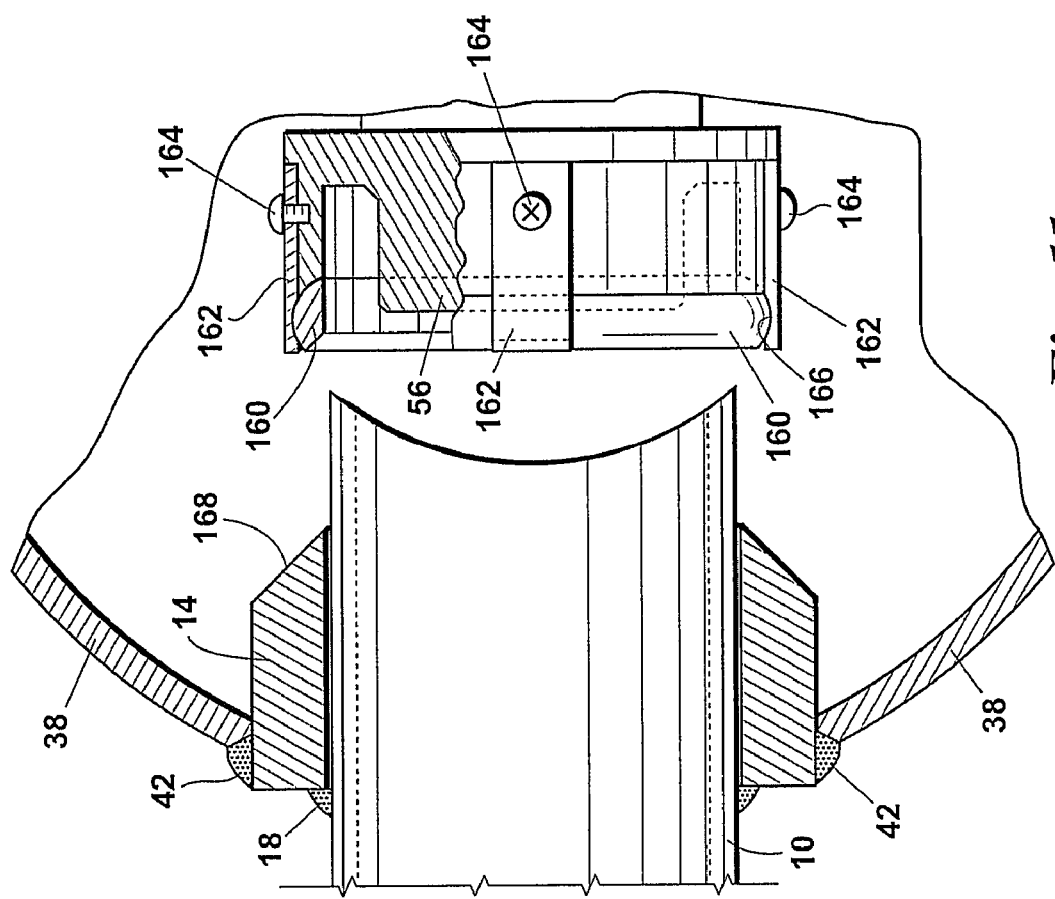
FIG. 11 is a cross-sectional elevational view illustrating a step in the sequence of positioning metallic ferrules on the end portion 10 of the pipeline.

FIG. 11 shows a seal cup 56 in position to insert a ferrule 160 onto the end of the pipeline while FIG. 12 shows the relationship of the seal cup 56 after the ferrule 160 has been positioned on the exterior surface of the pipeline and in contact with the forward face 168 of first collar 14. FIG. 12 shows the ferrule 160 in position on the outer exterior end 10 of a pipeline which has been cut into and with the ferrule 160 in position to be crimped.

Figure 13:
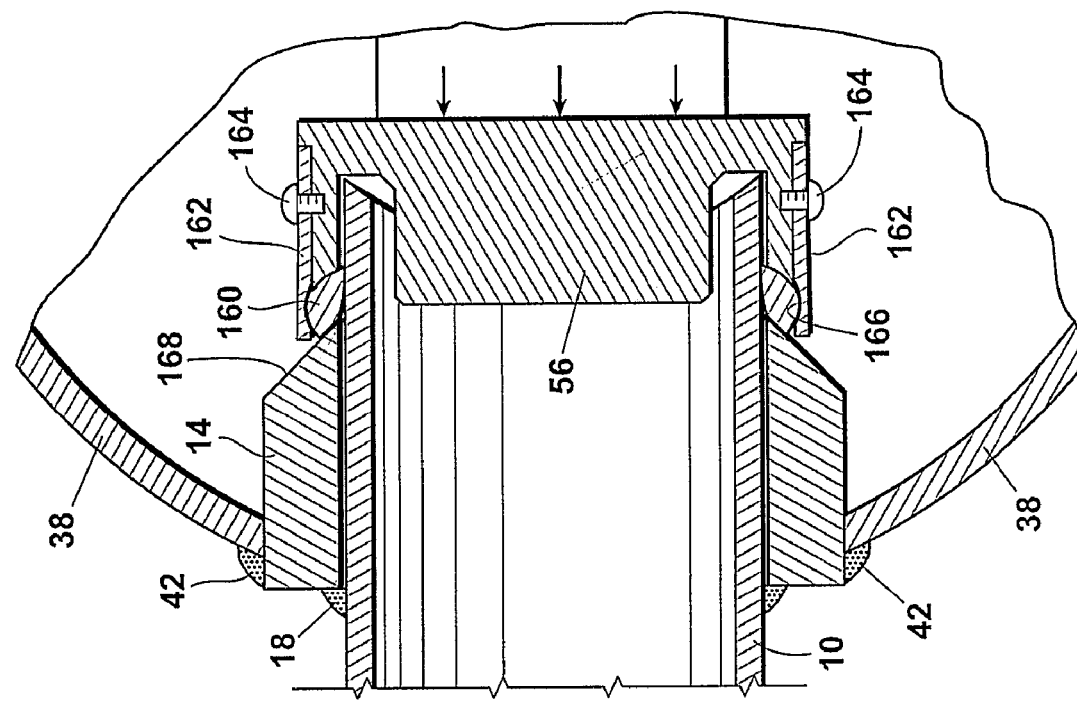
FIG. 13 is a further step in the process of mounting the ferrule on the cut end of a pipe in which it is illustrated deformation of the malleable ferrule by pressure applied from first seal cup.

FIG. 13 shows force being applied against seal cups 56 to crimp the malleable metallic ferrule 160 so that it is permanently deformed to engage the exterior surface of pipe 10 and simultaneously to sealably engage the forward face 168 of collar 14.

Ferrule 160 is metallic and is preferably of a malleable material that can, with sufficient force and pressure, be deformed to sealably contact the exterior surface of pipe 10 and simultaneously the forward surface 168 of collar 14.

Figure 14:
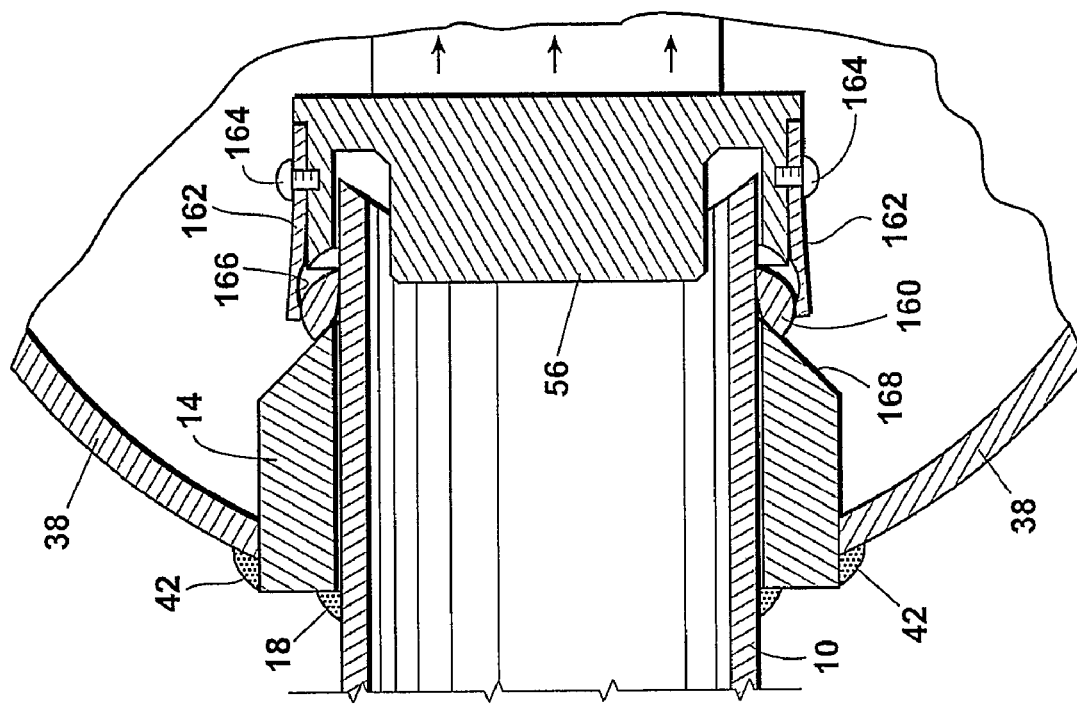
FIG. 14 is an illustration of a further step of the process of mounting the metallic ferrule on a pipe and in sealed position relative to the forward face of a first collar and wherein, after the mounting and sealing operations have taken place, the cup is withdrawn leaving the ferrule in sealed position relative to the pipeline and the collar.

FIG. 14 shows the ferrule 160 as having been permanently deformed into sealing engagement with the exterior surface of pipe 10 and forward face 168 of collar 14.

Figure 15:
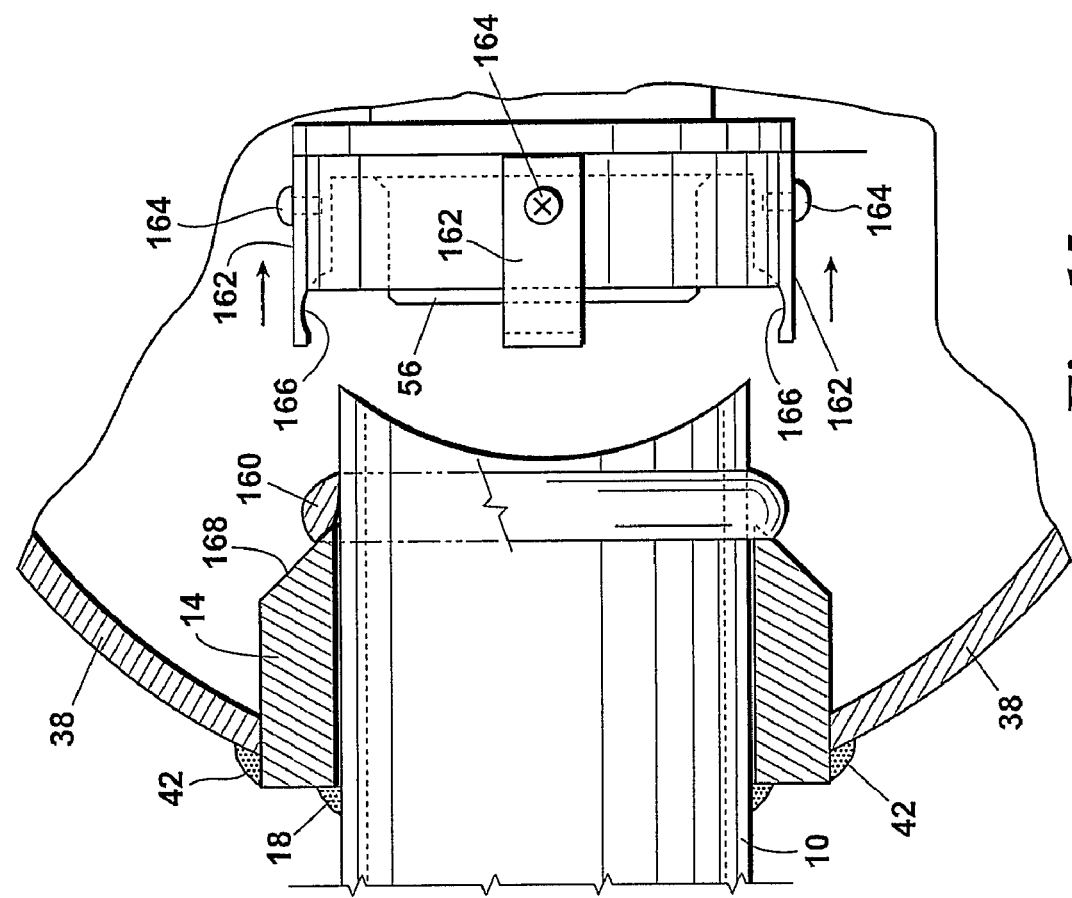
FIG. 15 is a further step in the illustration of mounting a malleable ferrule on the end of a pipe and in sealed contact with a collar surrounding the pipe and showing the seal cup withdrawn whereby the mechanism used for mounting can be removed from within the containment housing.

FIG. 15 illustrates how the retainers 162 release the ferrule 160 as the seal cup 56 is retracted from the portion of the pipeline 10. The ferrule 160 remains crimped to the exterior surface of the portion of pipeline 10 and the forward face 168 of the collar 14.

Figure 16:
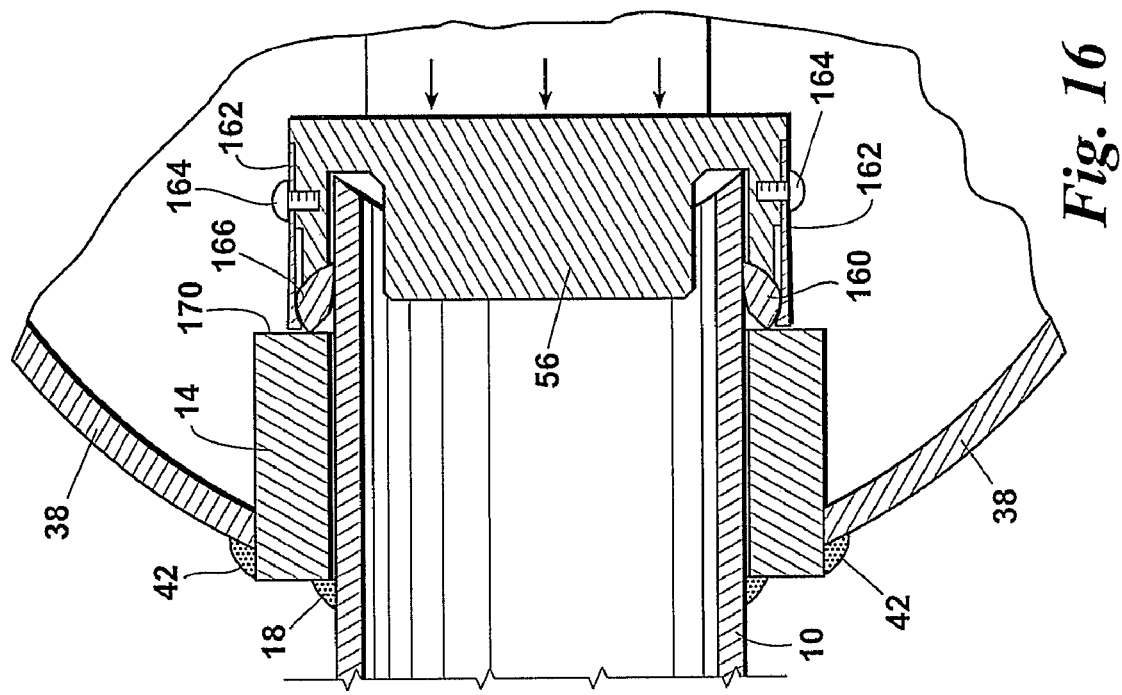
FIG. 16 shows an alternate embodiment of the process of crimping the ferrule into sealing engagement with the forward end of a collar and in which the collar has a planar forward surface against which the ferrule is pressed.

FIG. 16 shows a slightly alternate embodiment involving collar 14 in which, rather than having a frusto-conical forward face 168 as in FIGS. 10 through 15 has a planar radial face 170. The embodiment of FIG. 16 illustrates that the face configuration for collar 14 can vary as required to ensure effective distortion of ferrule 160 by the application of pressure against seal cup 56.

FIG. 16 shows an additional alternate embodiment in the configuration of retainer 162. In FIG. 16 the retainer 162 is thinner in the rearward direction while nevertheless providing a retention recess 166 so that ferrule 160 is retained in position as it is carried forward in the initial stages of the process of inserting the ferrule forward onto the end of a pipe as illustrated. The retainers 162 are essentially configured like a leaf-spring so they can flex within their elastic limit to retain a ferule in position to position it onto the end of a pipeline and hold it in such position as pressure is applied to deform the ferrule into permanent sealing engagement with the exterior of the pipeline and with a forward face of the collar which it contacts but nevertheless the spring tension is such that as the seal cup 56 is withdrawn as shown in FIGS. 14 and 15, the springs easily deflect to leave the deformed ferrule circumferentially surrounding the pipe 10 and in sealed engagement with the forward face of collar 14.

The invention herein has been illustrated to show how external seals can be employed to provide block and bleed functions to a pipeline that has been cut to allow fluid flow through the pipeline to be blocked wherein sealing is achieved by elastomeric members that require less forceful pressure to achieve sealing or by metallic members, such as the metallic ferrule illustrated and described herein wherein greater application pressure is required but thereby providing a closing system that is effective to maintain pipe closure even in the presence of high temperature, such as a fire. Further the use of a metal ferrule sealing system achieves longer life expectancy of the closure system since, unlike some elastomerics the ferrules used in practicing this invention may be of metals and alloys that can withstand the application to which they are put for extended periods of time. A period of time may be the life expectancy of the pipeline on which the invention herein is utilized.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A method of plugging a pipeline employing external elastomeric seals comprising the steps of:
    (a) affixing to the exterior of a pipeline first and second spaced apart collars, each collar having a forward sealing end and a rearward end, each forward receiving end having a circumferential recess therein;
    (b) welding said rearward end of each collar to the pipeline so that an operating space is provided between said forward sealing ends of said collars;
    (c) positioning opposed elastomeric seal in said circumferential recesses of said collars;
    (d) affixing a containment housing to said opposed collars providing a confined space around the pipeline and surrounding said operating space between said collars, said confined space being accessed by a passageway;
    (e) inserting a cutting tool through said passageway and cutting and removing a length of pipeline between said collars providing opposed pipeline end surfaces;
    (f) positioning first and second seal cups between said collars, each seal cup having a forwardly extending circumferential lip of internal diameter greater than the external diameter of the pipeline and of external diameter less than said circumferential recess at each of said collars; and
    (g) applying force to move said first and second seal cups away from each other and said circumferential lips of said seal cups into engagement with said opposed elastomeric seals secured by said collars to compress said elastomeric seals into sealing engagement with said pipeline exterior surface adjacent each said pipeline end surfaces.

2. A method of plugging a pipeline employing external elastomeric seals according to claim 1 wherein step (g) includes use of mechanical force to move said seal cups away from each other and into engagement with said elastomeric seals.

3. A method of plugging a pipeline employing external elastomeric seals according to claim 1 wherein step (g) employs moving opposed sides of a wedge against rearward faces of said seal cups.

4. A method of plugging a pipeline employing external elastomeric seals according to claim 3 wherein said first and second seal cups each has a top and bottom cam followers to guide the movement of said seal cups as said wedge is forced between said rearward faces of said seal cups.

5. A method of plugging a pipeline employing external elastomeric seals according to claim 4 including:
    retaining said seal cups between a top support and a bottom support, the top support having a pair of opposed cam slots therein slidably receiving said top cam follower of each said seal cup and the bottom support having a pair of opposed cam slots therein slidably receiving the bottom cam follower of each seal cup; and
    forcing said top and bottom supports towards each other to guide said seal cups away from each other.

6. A method of plugging a pipeline employing external elastomeric seals according to claim 5 wherein said seal cups, said top support and said bottom support and said wedge are transported as an assembly into and out of positions between said collars.

7. A method of plugging a pipeline employing external elastomeric seals according to claim 6 wherein said assembly is transported into and out of position between said collars by means of a rod moved by a piston reciprocated within a cylinder.

8. A method of plugging a pipeline employing external elastomeric seals according to claim 7 wherein said rod moved by said piston reciprocated within a cylinder is laterally movable but non-rotatably supported relative to said cylinder.

9. A method of plugging a pipeline employing external elastomeric according to claim 1 wherein in step (g) an open ended hydraulic cylinder is employed having a piston extending from each opposed end, each piston being laterally displaced by hydraulic fluid forced into said hydraulic cylinder.

10. A method of plugging a pipeline employing external elastomeric seals according to claim 9 wherein said first and second seal cups are attached to opposed forward faces of said pistons, said seal cups being thereby carried into position between said pipe sealing surfaces by said hydraulic cylinder and said pistons extending therefrom.

11. A method of plugging a pipeline employing external ferrules comprising the steps of:
    (a) sealably securing onto the exterior of the pipeline first and second spaced apart circumferential collars, each collar having a forward sealing face in a plane perpendicular the pipeline axis;

(b) welding upper and lower portions of a containment housing to said circumferential collars to provide a pressure retaining area around a length of the pipe between said collars, said containment housing having an opening therein that provides access to said pipeline between said collars;

(c) cutting and removing a length of pipeline from between said collars leaving two open pipe ends with an external pipe sealing surface adjacent each open pipe end;

(d) positioning first and second seal cups between said collars, each seal cup having a forward face with external diameter greater than the diameter of said pipeline;

(e) each said forward face carrying a circumferential ferrule of internal diameter greater than the external diameter of said pipeline;

(f) forcing said first and second seal cups apart from each other to position a ferrule onto the exterior surface of each of said pipe ends and adjacent said sealing face of each of said collars; and (g) further forcefully advancing said seal cups away from each other thereby forcing said ferrules into sealing engagement with said sealing face of each said collar thereby sealably closing both of said pipe ends.

12. A method of plugging a pipeline employing external ferrules according to claim 11 wherein step (e) employs moving opposed sides of a wedge against rearward faces of said seal cups.

13. A method of plugging a pipeline employing external ferrules according to claim 12 wherein said first and second seal cups each has a top and bottom cam followers to guide the movement of said seal cups as said wedge is forced between said rearward faces of said seal cups.

14. A method of plugging a pipeline employing external ferrules according to claim 13 including:

retaining said seal cups between a top support and a bottom support, the top support having a pair of opposed cam slots therein slidably receiving said top cam follower of each said seal cup and the bottom support having a pair of opposed cam slots therein slidably receiving the bottom cam follower of each seal cup; and forcing said top and bottom supports towards each other to guide said seal cups away from each other.

15. A method of plugging a pipeline employing external ferrules according to claim 14 wherein said seal cups, said top support and said bottom support and said wedge are transported as an assembly into and out of positions between said collars.

16. A method of plugging a pipeline employing external ferrules according to claim 15 wherein said assembly is transported into and out of position between said collars by means of a rod moved by a piston reciprocated within a cylinder.

17. A method of plugging a pipeline employing external ferrules according to claim 16 wherein said rod moved by said piston reciprocated within a cylinder is laterally movable but non-rotatably supported relative to said cylinder.

18. A method of plugging a pipeline employing external ferrules according to claim 11 wherein step (f) is performed by a hydraulic cylinder having pistons extending from opposed sides, each piston being laterally displaced by hydraulic fluid forced into said hydraulic cylinder.

19. A method of plugging a pipeline employing external ferrules according to claim 18 wherein said first and second seal cups are attached to opposed forward faces of said pistons, said seal cups being thereby carried into position between said pipe sealing surfaces by said hydraulic cylinder and said pistons extending therefrom.

20. A method of plugging a pipeline employing external ferrules according to claim 19 wherein a tubular housing is secured to said containment housing having therein a flexible hydraulic hose having one end in communication with said hydraulic cylinder and an opposite end in communication with a passageway in said tubular housing.

21. A method of plugging a pipeline comprising the steps of:

(a) affixing to the exterior of a pipeline first and second spaced apart collars, each collar having a forward sealing end and a rearward end;

(b) welding each of said collars to the pipeline so that an operating space is provided between said forward sealing ends of said collars;

(c) affixing a containment housing to said opposed collars providing a confined space around the pipeline and surrounding said operating space between said collars, said confined space being accessed by a passageway;

(d) inserting a cutting tool through said passageway and cutting and removing a length of pipeline between said collars;

(e) positioning first and second seal cups between said collars, each seal cup having a forwardly extending circumferential lip of internal diameter greater than the external diameter of the pipeline; and (f) employing a hydraulic cylinder having a piston extending from each opposed end, each piston being, laterally displaced by hydraulic fluid forced into said hydraulic cylinder, to move said first and second seal cups away from each other and said circumferential lips of said seal cups into sealing engagement with said forward sealing surface of each of said collars.

22. A method of plugging a pipeline according to claim 21 wherein said first and second seal cups are attached to opposed forward faces of said pistons, said seal cups being thereby carried into position between said sealing surface of each of said collars by said hydraulic cylinder and said pistons extending therefrom.

23. A method of plugging a pipeline according to claim 21 wherein each said cup circumferential lip carries a circumferential ferrule of internal diameter greater than the external diameter of said pipeline and wherein when said seal cups are forced apart said ferrule are carried onto the exterior surface of each of said pipe ends and further forcefully advancing said seal cups away from each other thereby forcing said ferrules into sealing engagement with said sealing face of each said collar.

24. A method of plugging a pipeline employing external ferrules comprising the steps of:

(a) sealably securing onto the exterior of the pipeline first and second spaced apart circumferential collars, each collar having a forward sealing face in a plane perpendicular the pipeline axis;

(b) welding upper and lower portions of a containment housing to said circumferential collars to provide a pressure retaining area around a length of the pipe between said collars, said containment housing having an opening therein that provides access to said pipeline between said collars;

(c) securing a tubular housing to said containment housing having therein a flexible hydraulic hose having one end in communication with a hydraulic cylinder, said hydraulic cylinder having pistons extending from opposed sides, and an opposite end in communication with a passageway in said tubular housing;

(d) cutting and removing a length of pipeline from between said collars leaving two open pipe ends with an external pipe sealing surface adjacent each open pipe end;
(e) positioning first and second seal cups between said collars, each seal cup having a forward face with external diameter greater than the diameter of said pipeline;
(f) each said forward face carrying a circumferential ferrule of internal diameter greater than the external diameter of said pipeline;
(g) employing said pistons, each piston being laterally displaced by hydraulic fluid forced into said hydraulic cylinder, to force said first and second seal cups, which are attached to opposed forward faces of said pistons, apart from each other to position a ferrule onto the exterior surface of each of said pipe ends and adjacent said sealing face of each of said collars; and
(h) further forcefully advancing said seal cups away from each other thereby forcing said ferrules into sealing engagement with said sealing face of each said collar thereby sealably closing both of said pipe ends.

25. A method of plugging a pipeline comprising the steps of:
(a) affixing to the exterior of a pipeline first and second spaced apart collars, each collar having a forward sealing end and a rearward end;
(b) welding each of said collars to the pipeline so that an operating space is provided between said forward sealing ends of said collars;
(c) affixing a containment housing to said opposed collars providing a confined space around the pipeline and surrounding said operating space between said collars, said confined space being accessed by a passageway;
(d) inserting a cutting tool through said passageway and cutting and removing a length of pipeline between said collars;
(e) positioning first and second seal cups between said collars, each seal cup having a forwardly extending circumferential lip of internal diameter greater than the external diameter of the pipeline wherein each said cup circumferential lip carries a circumferential ferrule of internal diameter greater than the external diameter of said pipeline;
(f) applying force to move said first and second seal cups away from each other and to carry said ferrules onto the exterior surface of each of said pipe ends; and
(g) further applying force to advance said ferrules into sealing engagement with said sealing face of each said collar.

* * * * *